US012052539B2

(12) United States Patent
Backman

(10) Patent No.: US 12,052,539 B2
(45) Date of Patent: Jul. 30, 2024

(54) LOUDSPEAKER

(71) Applicant: AAC Microtech (Changzhou) Co., Ltd., Changzhou (CN)

(72) Inventor: Juha Backman, Tampere (FI)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 126 days.

(21) Appl. No.: 17/879,755

(22) Filed: Aug. 2, 2022

(65) Prior Publication Data

US 2024/0048893 A1 Feb. 8, 2024

(51) Int. Cl.
*H04R 1/28* (2006.01)
*H04R 7/16* (2006.01)

(52) U.S. Cl.
CPC ............ *H04R 1/2811* (2013.01); *H04R 7/16* (2013.01)

(58) Field of Classification Search
CPC .... H04R 1/2811; H04R 7/16; H04R 2400/11; H04R 1/20; H04R 1/345; H04R 9/06; H04R 9/02
See application file for complete search history.

(56) References Cited

U.S. PATENT DOCUMENTS

2015/0071473 A1* 3/2015 Chick .................... H04R 1/20 381/337
2023/0142874 A1* 5/2023 Feng ..................... H04R 9/06 381/353

* cited by examiner

*Primary Examiner* — Tuan D Nguyen
(74) *Attorney, Agent, or Firm* — W&G Law Group

(57) ABSTRACT

A loudspeaker is disclosed, including a driver diaphragm, an enclosure and an outlet. The driver diaphragm is configured to produce acoustic waves. The enclosure includes an upper wall disposed opposite to the driver diaphragm and having an inner surface facing to the driver diaphragm, and a side wall connecting the upper wall to the driver diaphragm. The outlet is defined at the upper wall or the side wall, and configured to output the acoustic waves. The driver diaphragm and the enclosure define a front volume chamber communicating with the outlet. The front volume chamber and the outlet form a front cavity. The inner surface has a protruding part located close to the outlet, a distance from a position at the protruding part to the driver diaphragm is smaller than that from a position at other parts of the inner surface to the driver diaphragm.

18 Claims, 10 Drawing Sheets

LOUDSPEAKER

TECHNICAL FIELD

The present disclosure relates to the field of electronic devices and, more particularly, to a loudspeaker with a reduced intermodulation distortion.

BACKGROUND

Intermodulation distortion is caused by the movement of the loudspeaker diaphragm in the front cavity of a loudspeaker (a phenomenon often called "piano distortion"). This distortion is due to the variation of the frequency response. The presence of distortion can be easily measured using e.g. two-tone intermodulation distortion measurement or multitone distortion measurement.

In a conventional loudspeaker structure, which is simplified as shown in FIG. 1*a*, an enclosure 2 has an upper wall extending parallel to a driver diaphragm 1 to result in a constant width of the chamber in a movement direction of the driver diaphragm 1 at a rest position. An outlet 3 is provided at the enclosure 2. The outlet 3 and the chamber defined by the enclosure 2 and the driver diaphragm 1 form a front cavity of the loudspeaker. A frequency response variation is caused with movement of the driver diaphragm 1, which can be explained by using a corresponding equivalent circuit as shown in FIG. 1*b*. The outlet 3 works an acoustical inductor, and the chamber works as an acoustical capacitor. The width of the chamber changes with the movement of the driver diaphragm 1, resulting in the capacitance variation of the capacitor. The capacitor and the inductor cause the variation of the frequency response that causes the intermodulation distortion. Any measure that reduces frequency response variation with diaphragm movement does decrease this type of distortion.

SUMMARY

The present disclosure is intended to reduce the intermodulation distortion by minimizing the variation of frequency response.

An embodiment of the present disclosure provides a loudspeaker, including a driver diaphragm, an enclosure and an outlet. The driver diaphragm is configured to produce acoustic waves. The enclosure includes an upper wall disposed opposite to the driver diaphragm and having an inner surface facing to the driver diaphragm, and a side wall connecting the upper wall to the driver diaphragm. The outlet is defined at the upper wall or the side wall, and configured to output the acoustic waves. The driver diaphragm and the enclosure define a front volume chamber communicating with the outlet. The front volume chamber and the outlet form a front cavity. The inner surface has a protruding part located close to the outlet, a distance from a position at the protruding part to the driver diaphragm is smaller than that from a position at other parts of the inner surface to the driver diaphragm.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art(s) to make and use the disclosure. Embodiments of the disclosure are described, by way of example only, with reference to the accompanying drawings, in which.

Figure 1A:
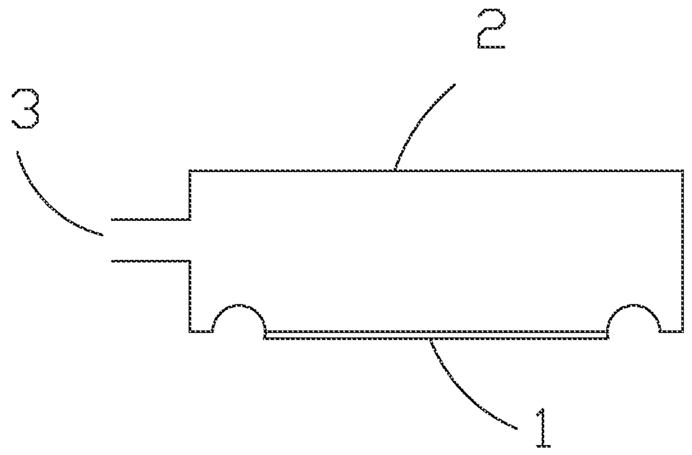
FIG. 1*a* is a schematic diagram of a loudspeaker of a conventional loudspeaker provided by the prior art.
Figure 1B:
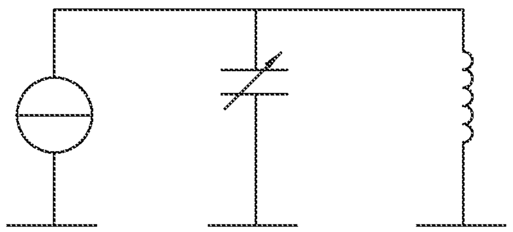
FIG. 1*b* is an equivalent circuit corresponding to the conventional loudspeaker of FIG. 1.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

This specification discloses one or more embodiments that incorporate the features of this disclosure. The disclosed embodiment(s) merely exemplify the disclosure. The scope of the disclosure is not limited to the disclosed embodiment(s). The disclosure is defined by the claims appended hereto.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Figure 2A:
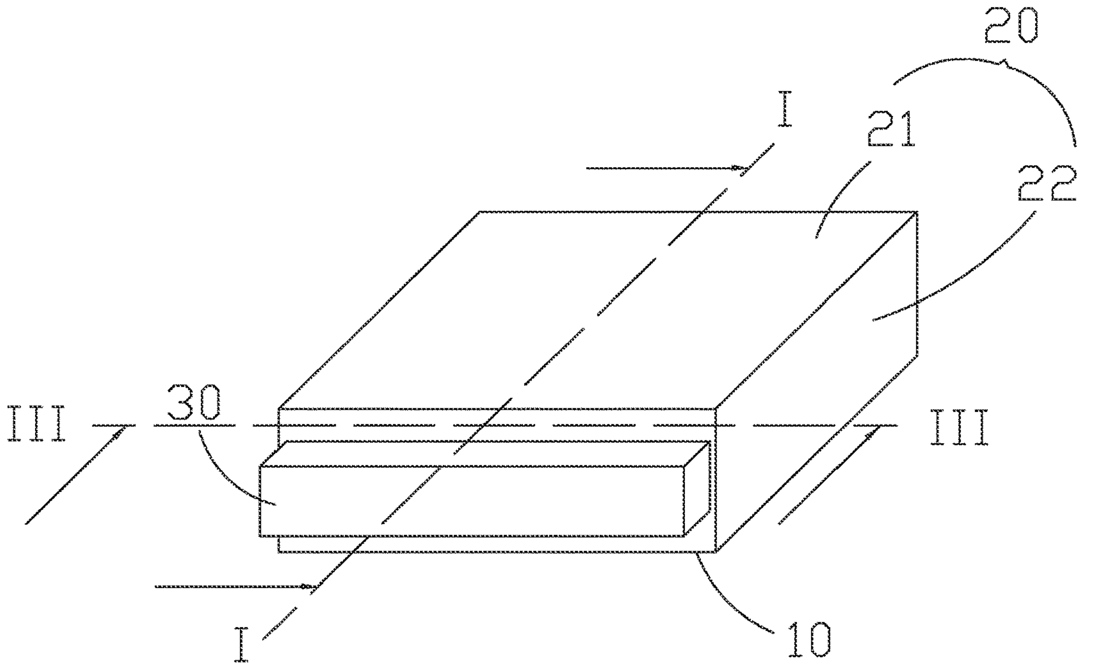
FIG. 2*a* is a schematically perspective view of an enclosure of a loudspeaker according to an embodiment of the present disclosure.

FIG. 2*a* is a perspective view of an enclosure of a loudspeaker according to a first embodiment of the present disclosure. The loudspeaker includes a driver diaphragm 10 configured to produce acoustic waves, an outlet 30 configured to output the acoustic waves and an enclosure 20. The enclosure 20 is formed by an upper wall 21 disposed opposite to the driver diaphragm 10, and a side wall 22 connecting the upper wall 21 to the driver diaphragm 10. In this embodiment, the outlet 30 may be disposed at the side wall 22. The driver diaphragm 10 and the upper wall 21 are spaced from each other and define a front volume chamber together with the side wall 22. The outlet 20 and the front volume chamber communicate with each other and form a front cavity of the loudspeaker. The acoustic waves produced by the driver diaphragm 10 may travel through the front volume chamber and then be directed out of the outlet 30.

Figure 2B:
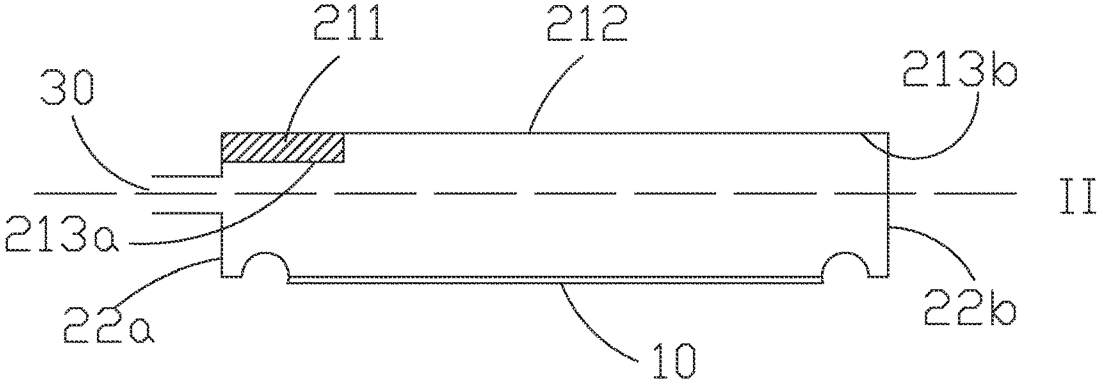
FIG. 2*b* is a schematically cross-sectional side view according to the embodiment of FIG. 2*a;*

FIG. 2*b* schematically shows a cross-sectional side view of an example according to the embodiment taken from I-I as shown in FIG. 2*a*. The upper wall 21 includes a first portion 211 and second portion 212 in a direction parallel to an axis II of the outlet 30. The axis II of the outlet 30 is parallel to a plane where the driver diaphragm 10 at a rest position is located (hereafter "the resting plane"), the first portion 211 is located adjacent to the outlet 30, and the second portion 212 is located next to the first portion 211 and away from the outlet 30. The upper wall 21 includes an inner surface within the front volume chamber and face to the driver diaphragm 10. The inner surface is divided into two areas, i.e., 213*a* and 213*b*, included in the first portion 211 and the second portion 212, respectively. The inner surface 213*a* at the first portion 211 is located closer to the driver diaphragm 10 than the inner surface 213*b* at the second portion 212 to the driver diaphragm 10. That is, a distance between the inner surface 213*a* at the first portion 211 and the driver diaphragm 10 is smaller than a distance between the inner surface 213*b* at the second portion 212 and the driver diaphragm 10. The rest position herein refers to a position where the driver diaphragm 10 remain stationary, without vibration, with respect to the upper wall.

Figure 2C:
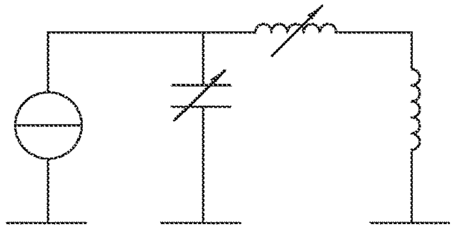
FIG. 2*c* is an equivalent circuit corresponding to the embodiment of FIG. 2*a;*

The embodiment according to the present disclosure is to reduce the width of a part of the chamber in front of the moving diaphragm by introducing reduced distance between the inner surface of the upper wall and the diaphragm, so that it effectively forms a variable-width extension to the outlet while keeping the rest part of the chamber away from the outlet wider, although still unavoidably variable. An equivalent circuit corresponding to the embodiment is shown in FIG. 2*c*. Compared with the conventional loudspeaker, in addition to a capacitor with variable capacitance, an inductor with variable inductance is further introduced into the circuit. The constriction part resulted from the reduced distance works as an acoustical inductor, and the width of the constriction part changes with the movement of the diaphragm, resulting in the inductance variation. That is, the constriction part of the chamber may be taken as a part of an output port of the loudspeaker, instead of having the output port completely outside the diaphragm as in conventional designs. When the driver diaphragm moves with the audio signal, the capacitance of the chamber and the inductance of the constriction part both vary with audio signal. The combined effect of these two variable components is to reduce the overall variation of the resonance frequency which causes the intermodulation distortion. The resonance frequency may be kept approximately constant.

In the example as shown in FIG. 2*b*, two opposite side walls may be provided and designated as a first side wall 22*a* and a second side wall 22*b*. The outlet 30 may be disposed at the first side wall 22*a*. The first portion 211 may extend to a connection between the upper wall and the first side wall 22*a* in the direction parallel to the axis II of the outlet 30. That is, the first portion 211 has one end connected with the first side wall 22*a*. The inner surface 213*a* at the first portion 211 may extend parallelly to the resting plane, such that the first portion 211 forms a step relative to the second portion 212. As shown in FIG. 2*b*, the inner surface 213*a* at the first portion 211 is located higher than an upper periphery of the outlet 30. Alternatively, it is possible that the inner surface 213*a* at the first portion 211 is flush with an upper periphery of the outlet 30, not show in FIG. 2*b*. That is, a distance from the inner surface 213*a* at the first portion 211 to the driver diaphragm 10 is equal to a distance from the upper periphery of the outlet 30 to the driver diaphragm 10. Variants based on the overall concept and principle of the present disclosure will be described in other examples and embodiments as follows.

Figure 3A:
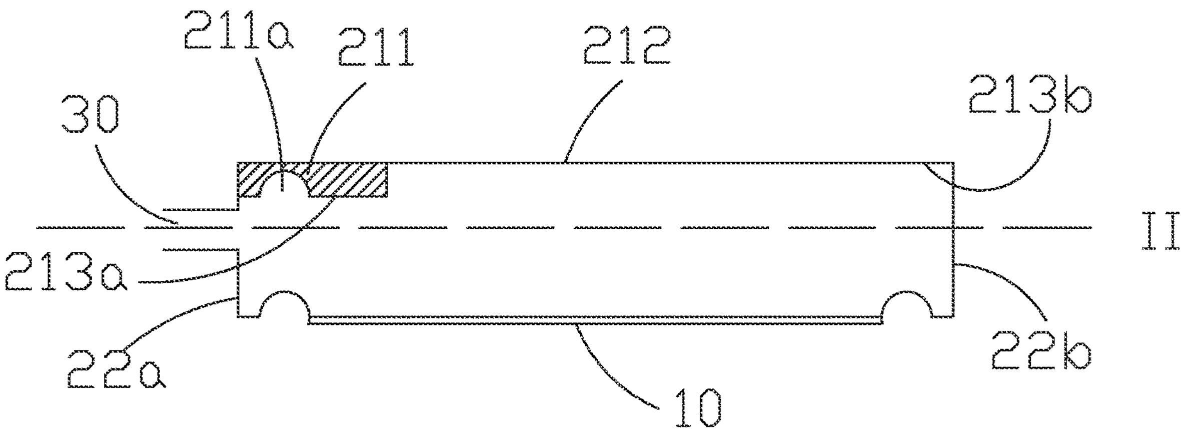
FIG. 3*a* is a schematically cross-sectional side view of another example according to the embodiment of FIG. 2*a* taken from I-I.

FIG. 3*a* shows a schematically cross-sectional side view of another example. The outlet 30 may be disposed at the side wall 22*a*. In FIG. 3*a*, the first portion 211 further has a recess 211*a* in such a way that the inner surface 213*a* at the first portion 21 extends in accordance with extension of an edge of the driver diaphragm 10 under the first portion 211. As shown in FIG. 3*a*, the inner surface 213*a* at the first portion 211 is located higher than an upper periphery of the outlet 30. Alternatively, it is possible that the inner surface 213*a* at the first portion 211 is flush with an upper periphery of the outlet 30, not show in FIG. 3*a*.

Figure 3B:
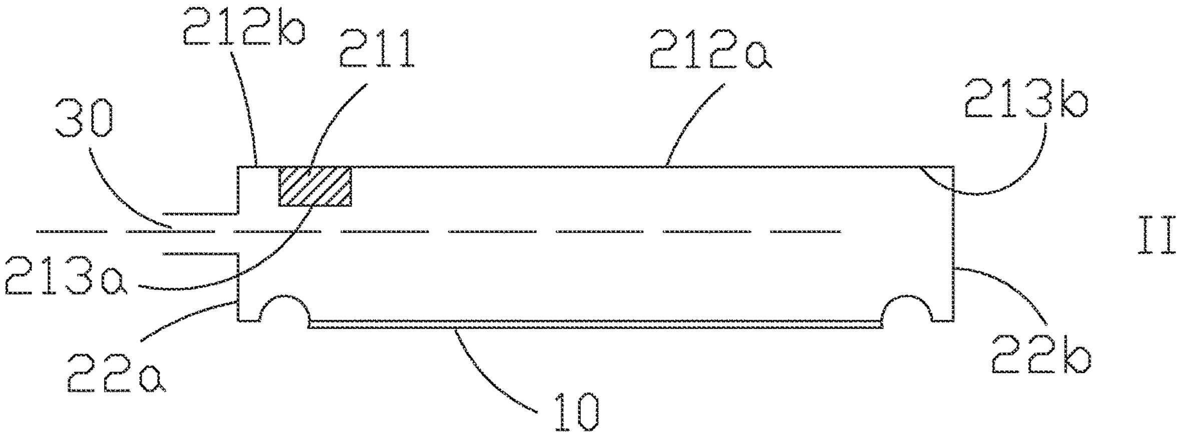
FIG. 3*b* is a schematically cross-sectional side view of still another example according to the embodiment of FIG. 2*a* taken from I-I.

FIG. 3*b* shows a schematically cross-sectional side view of still another example. The loudspeaker in also has the outlet 30 disposed at the side wall 22*a*. In FIG. 3*b*, the upper wall 21 is provided with two second portions 212*a*, 212*b*, and the first portion 211 is sandwiched between and connected with the two second portions 212*a*, 212*b*. That is, the first portion 211 in this example may not need to extend to connect with the first side wall 22*a*, but may have one end extending towards the connection between the upper wall and the first side wall 22*a* and spaced from the first side wall 22*a* by a further second portion 212*b* that connects with the first wall 22*a*. The additional second portion 212*b* may have a much smaller width in the direction parallel to the axis II of the outlet 30 that that of the second portion 212*a*, which ensures that the first portion 211 is located close to the outlet 30. As shown in FIG. 3*b*, the inner surface 213*a* at the first portion 211 is located higher than an upper periphery of the outlet 30. Alternatively, it is possible that the inner surface 213*a* at the first portion 211 is flush with an upper periphery of the outlet 30, not show in FIG. 3*b*.

Figure 3C:
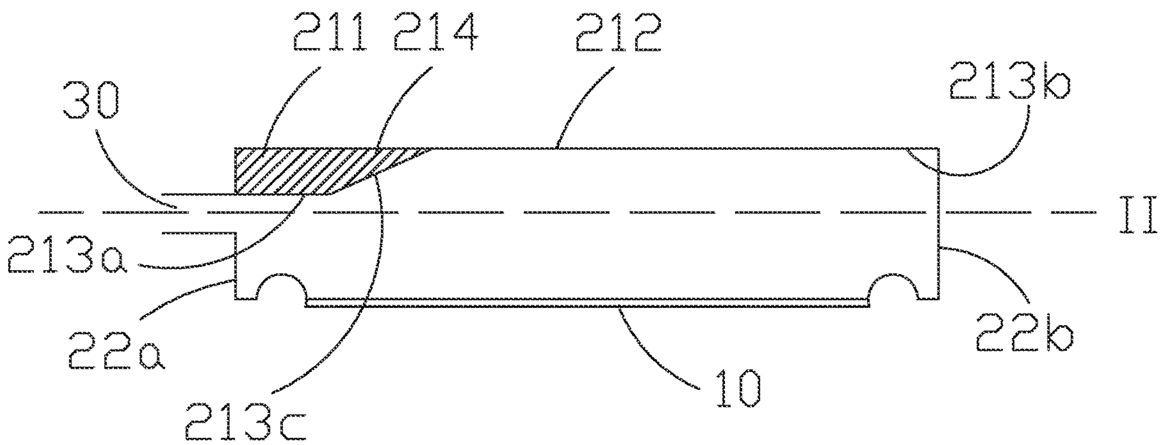
FIG. 3*c* is a schematically cross-sectional side view of still another example according to the embodiment of FIG. 2*a* taken from I-I.

FIG. 3*c* shows a schematically cross-sectional side view of still another example. The loudspeaker also has the outlet 30 disposed at the side wall 22*a*. In FIG. 3*c*, the upper wall 21 may further include a third portion 214 transitioning between the first portion 211 and the second portion 212. Unlike the first portion 211 forming a step relative to the second portion 212, the third portion 214 may be a slope for providing a continuously gradient transition between the step surface and the "ground" surface. The inner surface 213*c* at the third portion 214 may extend from the inner surface 213*a* at the first portion 211 to the inner surface 213*b* at the second portion 213*b*. Thus, a distance between the inner surface 213*c* at the third portion 214 and the driver diaphragm 10 may gradually increase in a direction from the first portion 211 to the second portion 212. As shown in FIG. 3*c*, the inner surface 213*a* at the first portion 211 is flush with an upper periphery of the outlet 30. Alternatively, it is also possible that the inner surface 213*a* at the first portion 211 is located higher that an upper periphery of the outlet 30, not shown in FIG. 3*c*. That is, a distance from the inner surface 213*a* at the first portion 211 to the driver diaphragm 10 is larger than a distance from the upper periphery of the outlet 30 to the driver diaphragm 10.

Figure 3D:
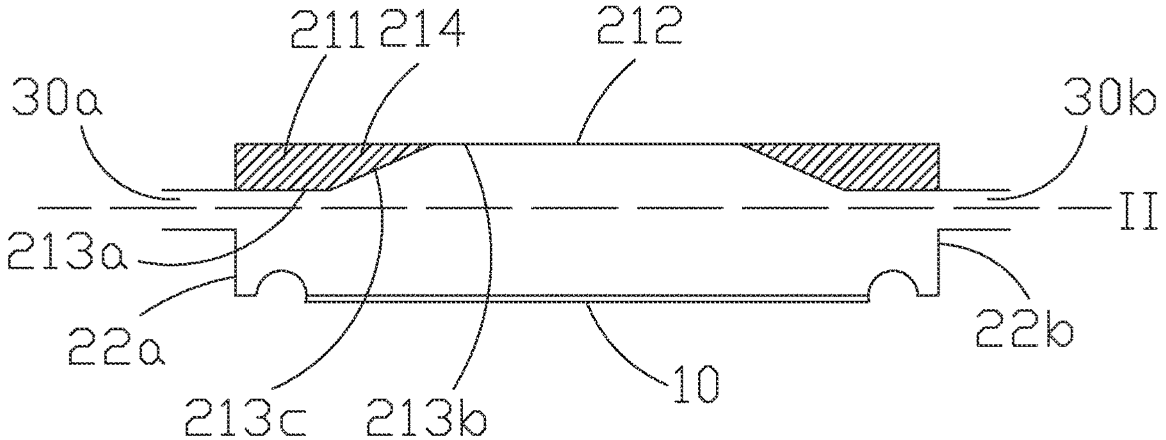
FIG. 3*d* is a schematically cross-sectional side view of still another example according to the embodiment of FIG. 2*a* taken from I-I, in which the loudspeaker includes two outlets.

Further to the above described examples, it is possible that the loudspeaker in some other examples may include two outlets at the two opposite side walls, respectively. In this case, the upper portion near each of the outlets may have a structure similar to any one of the examples described above. For example, the upper wall may include two first portions, or as well as two third portions, arranged at two opposite sides of the upper wall for the two outlets. FIG. 3*d* schematically shows still another example in which the loudspeaker includes two outlets 30*a* and 30*b* disposed at the first side wall 22*a* and the second side wall 22*b*, respectively. The upper wall 21 has a symmetric structure in a direction from the first outlet 30*a* to the second outlet 30*b*. The upper wall 21 near the first side wall 22*a* (the left side in FIG. 3*d*) is configured similarly to the example described above. And the upper wall 21 near the second side wall 22*b* (the right side in FIG. 3*d*) is configured symmetrically to that near the first side wall 22*a*.

Figure 3E:
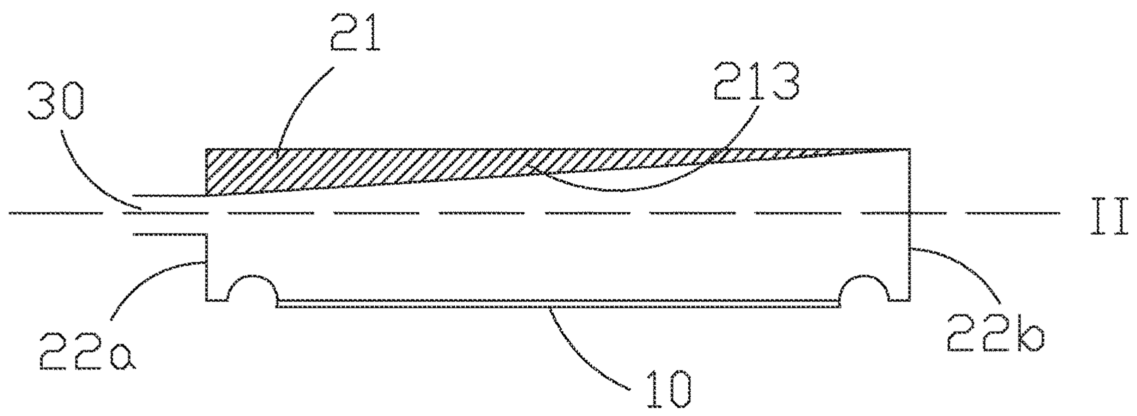
FIG. 3*e* is a schematically cross-sectional side view of still another example according to the embodiment of FIG. 2*a* taken from I-I.

FIG. 3*e* schematically shows still another example according to the embodiment of FIG. 2*a*, in which a cross-sectional side view is schematically illustrated. The loudspeaker also has the outlet 30 disposed at the side wall 22. In FIG. 3*e*, the distance between the inner surface 213 of the upper wall 21 and the driver diaphragm 10 may not constant in any portion or steeply increase. The distance between the driver diaphragm 10 and the inner surface 213 of the upper wall 21 may gradually increase from a connection between the upper wall 21 and the first side wall 22*a* to a connection between the upper wall 21 and the second side wall 22*b*.

Figure 4A:
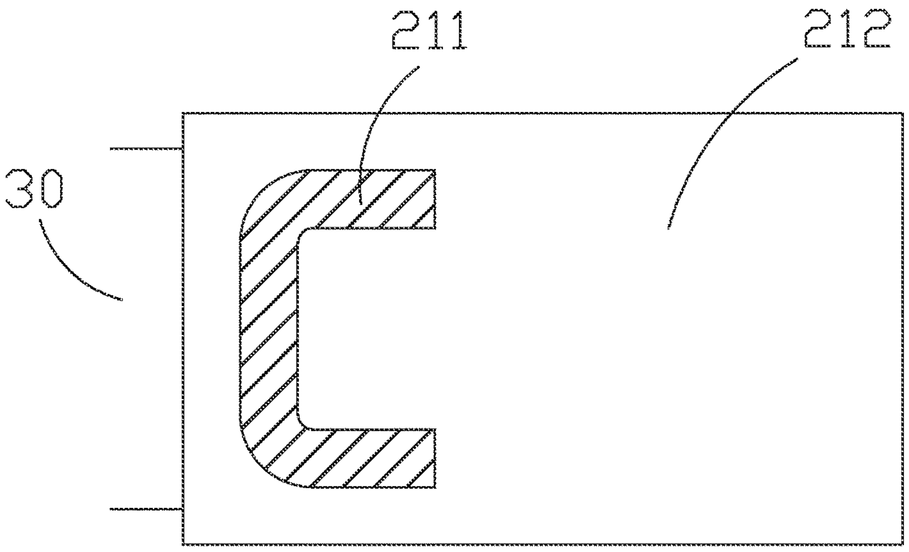
FIG. 4*a* and FIG. 4*b* are schematically cross-sectional side views of still another example according to the embodiment of FIG. 2*a* taken from III-III and I-I, respectively.
Figure 4B:
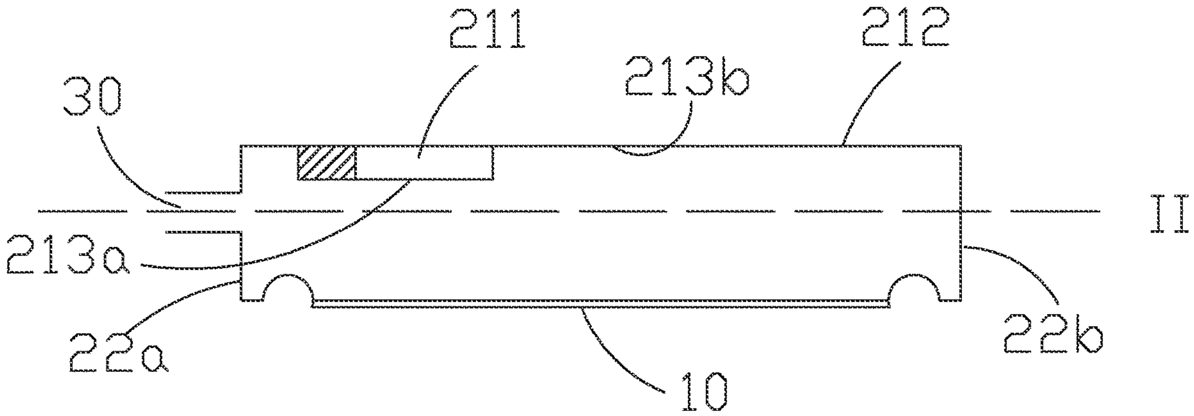

FIG. 4*a* and FIG. 4*b* schematically show cross-sectional side views of still another example according to the embodiment of FIG. 2*a* taken from III-III and I-I, respectively. In this example, merely one outlet 30 is provided at the first side wall 22*a*, and the first portion 211 of the upper wall 21 has a C-shape in a cross section taken from a plane parallel to the resting plane. The C-shaped first portion 211 has a body extending along the first side wall 22*a* and two arms extending from two opposite ends of the body and along two opposite side walls of the enclosure 20 between which the first side wall 22*a* is connected. The body of the first portion 211 is located close to the outlet 30, and the two arms extends away from the outlet 30. The inner surface 213*a* at the first portion 211 is located closer to the driver diaphragm 10 than the inner surface 213*b* at the second portion 212 to the driver diaphragm 10.

Figure 5A:
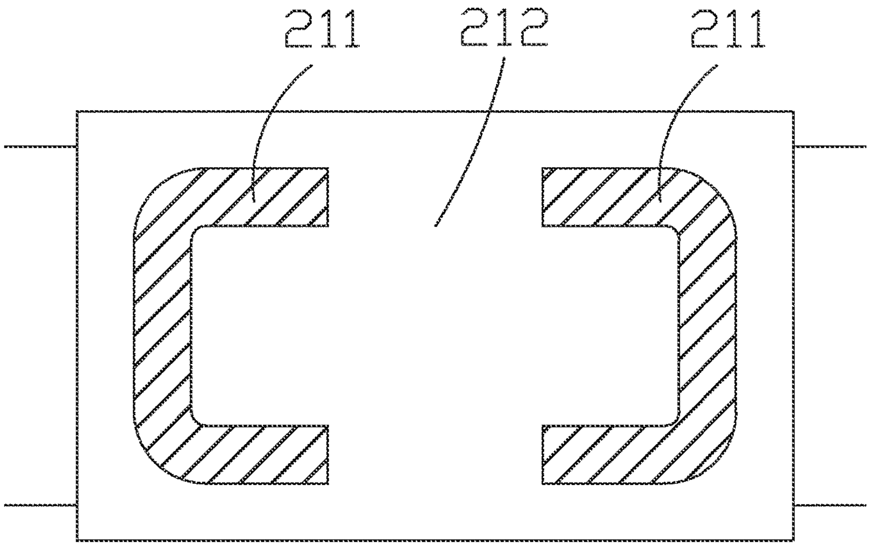
FIG. 5*a* and FIG. 5*b* are schematically cross-sectional side views of still another example according to the embodiment of FIG. 2*a* taken from III-III and I-I, respectively.
Figure 5B:
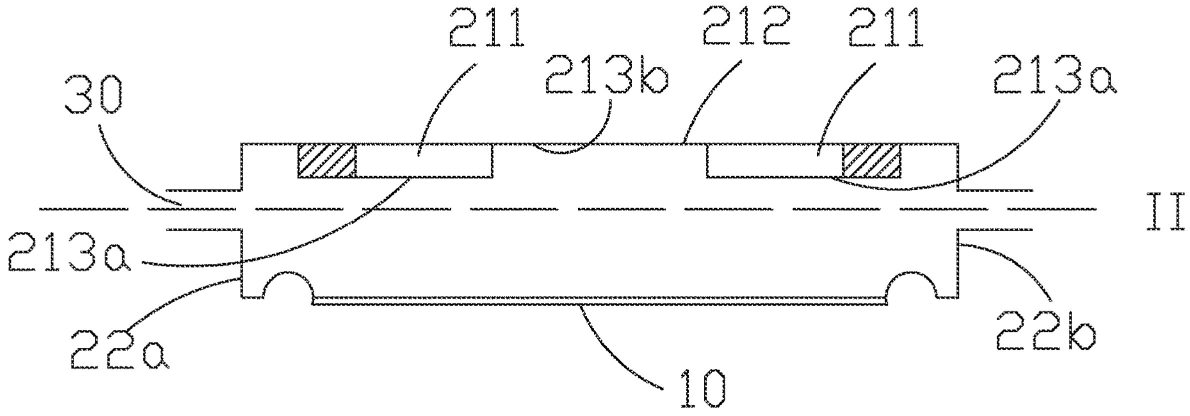

FIG. 5*a* and FIG. 5*b* schematically show cross-sectional side views of still another example, in which each of the first side wall 22*a* and the second side wall 22*b* is provide with a respective outlet 30*a*, 30*b*. The upper wall 21 has a symmetric structure in a direction from the first outlet 30*a* to the second outlet 30*b*. The upper wall 21 near the first side wall 22*a* (the left side in FIGS. 5*a* and 5*b*) is configured similarly to the example in FIGS. 4*a* and 4*b*. And the upper wall 21 near the second side wall 22*b* (the right side in in FIGS. 5*a* and 5*b*) is configured symmetrically to that near the first side wall 22*a*. That is, the first portion 211 of the upper 21 includes two C-shaped structures disposed oppositely, each of which is located near the respect outlet 30*a*, 30*b*.

Figure 6A:
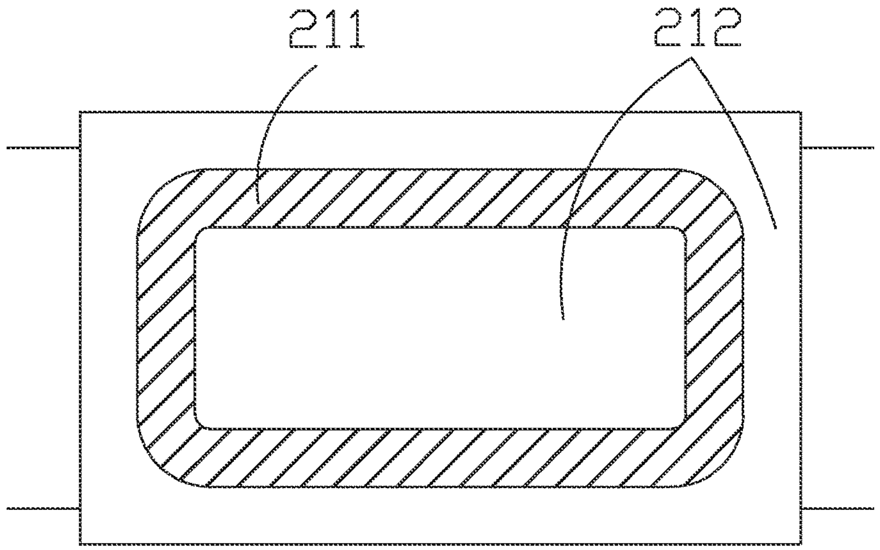
FIG. 6*a* and FIG. 6*b* are schematically cross-sectional side views of still another example according to the embodiment of FIG. 2*a* taken from III-III and I-I, respectively.
Figure 6B:
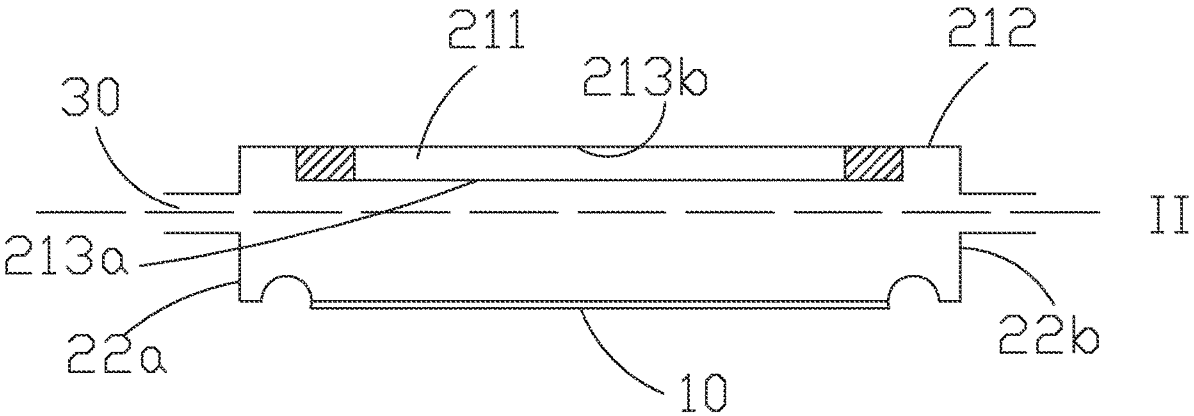

FIG. 6*a* and FIG. 6*b* schematically show cross-sectional side views of still another example, in which each of the first side wall 22*a* and the second side wall 22*b* is provide with an outlet 30*a*, 30*b*. In this example, the first portion 211 of the upper wall 21 is of a ring. That is, a cross section of the first portion 211 taken from a plane parallel to the resting plane is of a closed circle. The ring-shaped first portion 211 includes two pairs of opposing beams, namely a first pair and a second pair, extending along the side wall of the enclosure 20. The first pair of opposing beams extend parallelly to and located close to the first side wall 22*a* and the second side wall 22*b*, respectively, and the second pair of opposing beams connect the first pair of opposing beams. The inner surface 213*a* at the first portion 211 is located closer to the driver diaphragm 10 than the inner surface 213*b* at the second portion 212 to the driver diaphragm 10.

Figure 7A:
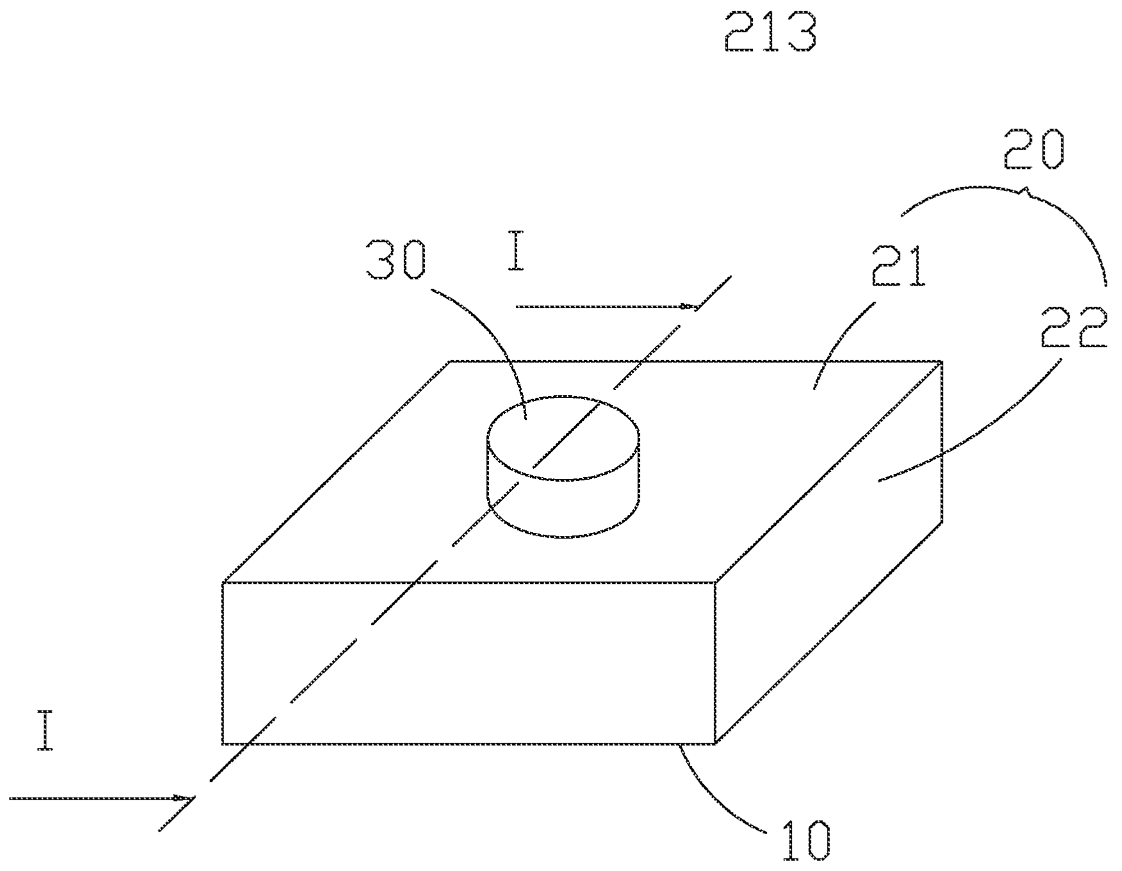
FIG. 7*a* is a schematically perspective view of an enclosure of a loudspeaker according to another embodiment of the present disclosure.

In another embodiment, it is possible that the outlet is disposed at the upper wall of the loudspeaker, as shown in FIG. 7*a*, other than the side wall as described in the above embodiments.

Figure 7B:
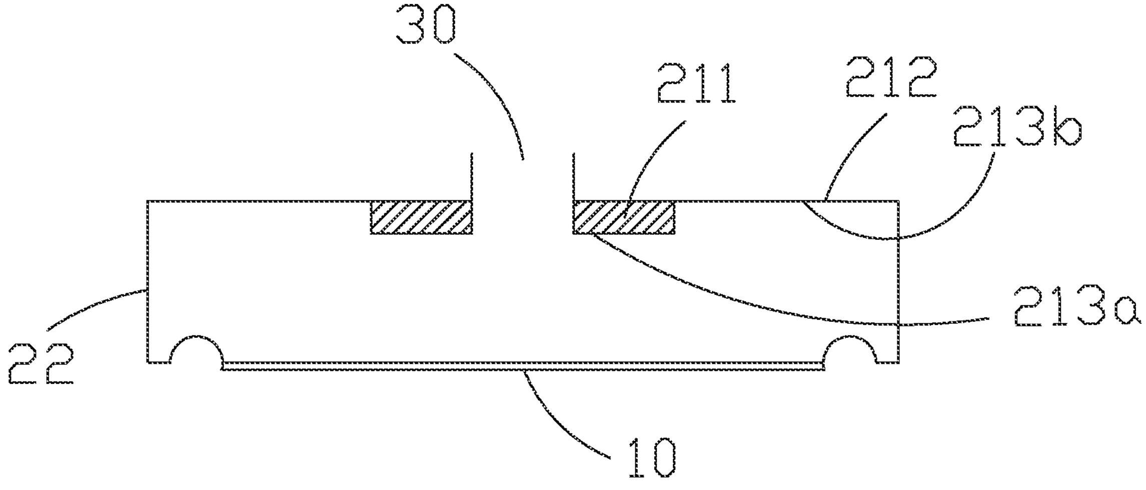
FIG. 7*b* is a schematically cross-sectional side view of the embodiment of FIG. 7*a* taken from I-I.

FIG. 7*b* schematically shows a cross-sectional side view of an example according to the embodiment taken from I-I as shown in FIG. 7*a*. The outlet 30 may be disposed at the upper wall 21. The upper wall 21 may include a first portion 211 and a second portion 212 along a radial direction of the outlet 30. The first portion 211 may have a ring shape surrounding the outlet 30, and the second portion may also have a ring shape surrounding the first portion 211. The first portion 211 may extend radially to connect between the outlet 30 and the second portion 212. The inner surface 213*a* at the first portion 211 is located closer to the driver diaphragm 10 than the inner surface 213*b* at the second portion 212 to the driver diaphragm 10. That is, a distance between the inner surface 213*a* at the first portion 211 and the driver diaphragm 10 is smaller than a distance between the inner surface 213*b* at the second portion 212 and the driver diaphragm 10. The inner surface 213*a* at the first portion 211 is ring-shaped and extends along a periphery of the outlet 30, and thus two shaded zones by two opposite sides of the outlet 30 are presented from the cross-sectional side view as shown in FIG. 7*b*. Similarly, the inner surface 213*b* at the second portion 212 is also ring-shaped. The inner surface 213*a* at the first portion 211 may extend parallelly to the resting plane, such that the first portion 211 forms a ring-shaped step relative to the second portion 212.

Figure 8A:
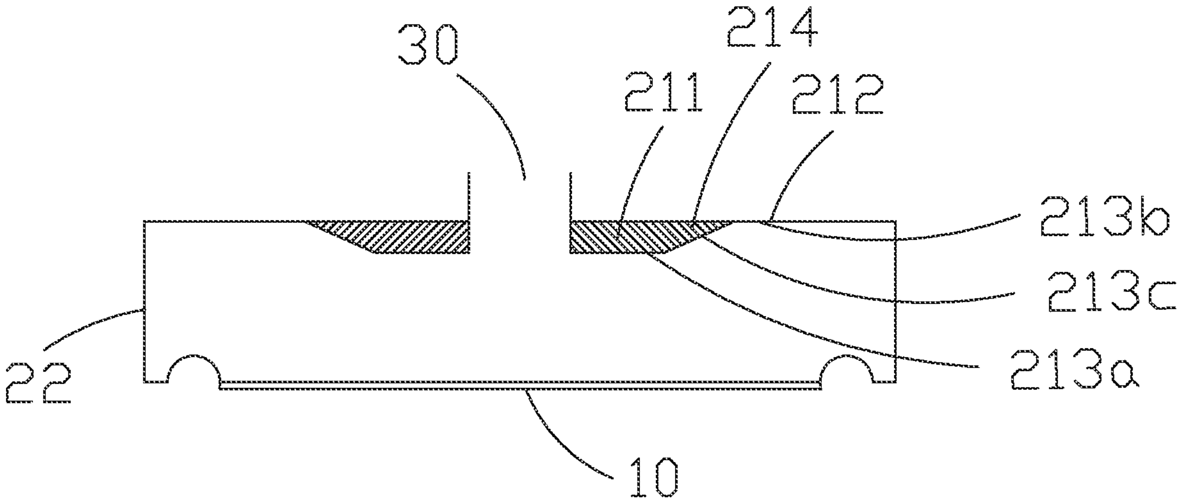
FIG. 8*a* is a schematically cross-sectional side view of another example according to the embodiment of FIG. 7*a* taken from I-I.

FIG. 8*a* shows a schematically cross-sectional side view of another example. The loudspeaker also has the outlet 30 disposed at the middle of the upper wall 21. In FIG. 8*a*, the upper wall 21 may further include a third portion 214 transitioning between the first portion 211 and the second portion 212. The inner surface 213*c* at the third portion 214 may extend from the inner surface 213*a* at the first portion 211 to the inner surface 213*b* at the second portion 213*b*, and thus is ring-shaped. Therefore, a distance between the inner surface 213*c* at the third portion 214 and the driver diaphragm 10 may gradually increase in a radial direction from the first portion 211 to the second portion 212.

Figure 8B:
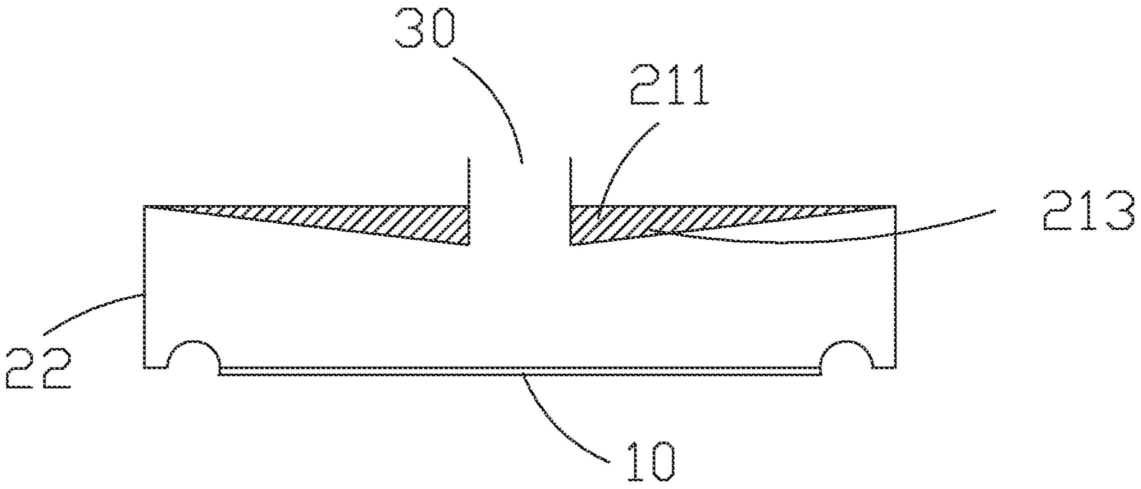
FIG. 8*b* is a schematically cross-sectional side view of still another example according to the embodiment of FIG. 7*a* taken from I-I.

FIG. 8*b* shows a schematically cross-sectional side view of still another example. The loudspeaker also has the outlet 30 disposed at the middle of the upper wall 21. In FIG. 8*b*, no step is formed in the upper wall in this example, and instead, continuous gradient may be presented for the inner surface of the upper wall from the periphery of the outlet 30 to the connection between the upper wall 21 and the side wall 22. The distance between the driver diaphragm 10 and the inner surface 213 of the upper wall 21 may gradually increase from the periphery of the outlet 30 to a connection between the upper wall 21 and the side wall 22.

It should be noted that the upper wall 21 described in the aforementioned embodiments and examples thereof may be integrally formed. Alternatively, the upper wall 21 may be formed in two or more pieces, including a plate 23 fixed to or integrally formed with the side wall 22, and a protrusion 24 attached to a surface of the plate 23 facing to the driver diaphragm 10. The protrusion 24 extends from the plate 23 toward the driver diaphragm 10 to form the step and/or the slope described above.

Although, in the above embodiments and examples thereof, the enclosure of the loudspeaker introduced is shaped as cuboid, it should be appreciated that the present disclosure may be applicable to the loudspeaker with other shapes, for example, cylinder.

Figure 9A:
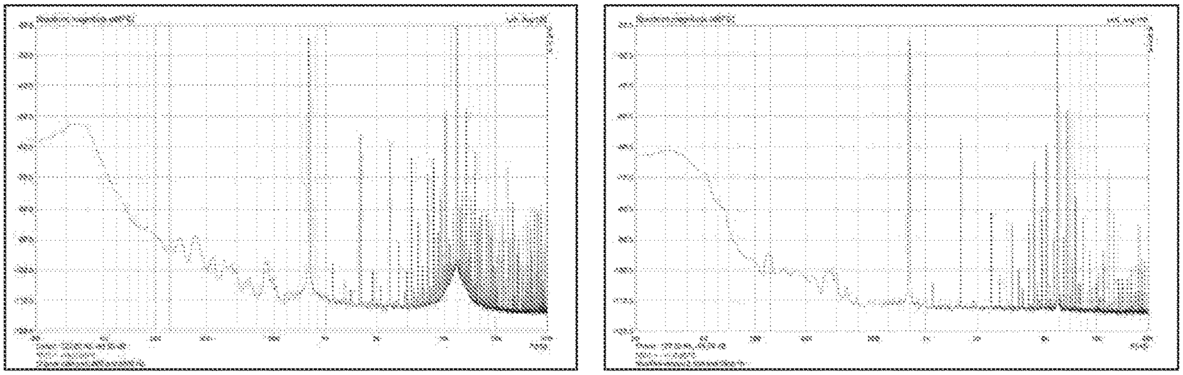
FIG. 9*a* is a graph showing two-tone intermodulation distortion measurement of a loudspeaker according to the present disclosure (right) compared with a conventional solution (left).
Figure 9B:
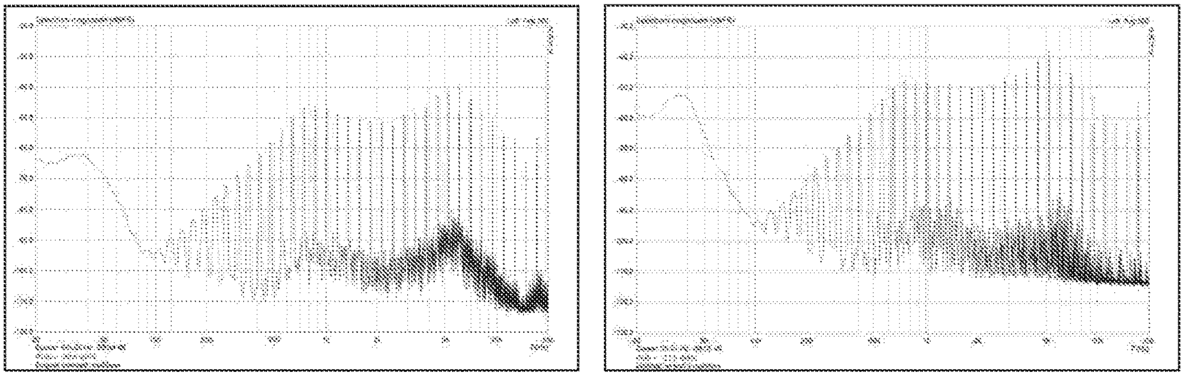
FIG. 9*b* is a graph showing multitone intermodulation distortion measurement graph of a loudspeaker according to the present disclosure (right) compared with a conventional solution (left).

FIG. 9*a* and FIG. 9*b* show the reduction in intermodulation distortion of the solution according to the present application (right) compared with a conventional solution (left), where FIG. 9*a* employs a two-tone test signal and FIG. 9*b* employs a multitone test signal. The signal that drives the loudspeaker in FIG. 9*a* consists of two sinusoidal peaks at 800 Hz and 5 kHz. The reduction of the "grass" of the right graph compared to that of the left graph indicates a distortion reduction by using the solution according to the present application. The same goes for multitone measurements in FIG. 9*b*.

While specific embodiments of the disclosure have been described above, it will be appreciated that the disclosure may be practiced otherwise than as described. The descriptions above are intended to be illustrative, not limiting. Thus it will be apparent to one skilled in the art that modifications may be made to the disclosure as described without departing from the scope of the claims set out below.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A loudspeaker, comprising:

a driver diaphragm configured to produce acoustic waves;

an enclosure comprising an upper wall disposed opposite to the driver diaphragm and having an inner surface facing the driver diaphragm, and a side wall connecting the upper wall to the driver diaphragm; and an outlet provided at the upper wall or the side wall, and configured to output the acoustic waves;

wherein the driver diaphragm and the enclosure define a front volume chamber communicating with the outlet, the front volume chamber and the outlet form a front cavity, the inner surface has a protruding part located close to the outlet, a distance from a position at the protruding part to the driver diaphragm is smaller than that from a position at other parts of the inner surface to the driver diaphragm.

2. The loudspeaker according to claim 1, wherein the outlet is disposed at the side wall, the upper wall comprises a first portion and a second portion in a direction parallel to an axis of the outlet, the first portion is located adjacent to the outlet, the second portion is located away from the outlet, a distance from the driver diaphragm to the inner surface at the first portion is smaller than that from the driver diaphragm to the inner surface at the second portion.

3. The loudspeaker according to claim 2, wherein the inner surface at the first portion extends parallelly to a plane where the driver diaphragm is located.

4. The loudspeaker according to claim 3, wherein the upper wall further comprises a third portion transitioning between the first portion and the second portion, a distance from the driver diaphragm to the inner surface at the third portion gradually increases in a direction from the first portion to the second portion.

5. The loudspeaker according to claim 2, wherein the inner surface at the first portion is flush with an upper periphery of the outlet.

6. The loudspeaker according to claim 1, wherein two side walls are provided opposite to each other, the outlet is disposed at one of the two side walls, the upper wall has a first end connected with the one of the two side walls, where the outlet is disposed, and a second end connected with an other one of the two side walls, a distance from the driver diaphragm to the inner surface of the upper wall gradually increases from the first end to the second end.

7. The loudspeaker according to claim 1, wherein the outlet is disposed at the upper wall, the upper wall comprises a first portion surrounding the outlet and a second portion surrounding the first portion, the first portion is located adjacent to the outlet, a distance from the driver diaphragm to the inner surface at the first portion is smaller than that from the driver diaphragm to the inner surface at the second portion.

8. The loudspeaker according to claim 7, wherein the inner surface at the first portion extends parallel to a plane where the driver diaphragm is located.

9. The loudspeaker according to claim 8, wherein the upper wall further comprises a third portion transitioning between the first portion and the second portion, a distance from the driver diaphragm to the inner surface at the third portion gradually increases in a direction from the first portion to the second portion.

10. The loudspeaker according to claim 1, wherein the outlet is disposed at the upper wall, a distance from the driver diaphragm to the inner surface of the upper wall gradually increases from a periphery of the outlet to a connection between the upper wall and the side wall.

11. The loudspeaker according to claim 1, wherein a first portion of the upper wall has a C-shape in a cross section parallel to a plane where the driver diaphragm is located, the first portion includes a body located close to the outlet and two arms connecting both ends of the body and extending away from the outlet.

12. The loudspeaker according to claim 1, wherein two side walls are provided oppositely, each of which is provide with a respective outlet, the first portion of the upper wall has a ring-shape in a cross section parallel to a plane where the driver diaphragm is located, the first portion includes two opposing beams, each of which is located close to the respective outlet.

13. A loudspeaker, comprising:

a driver diaphragm configured to produce acoustic waves;

an enclosure comprising an upper wall disposed opposite to the driver diaphragm, and a side wall connecting the upper wall to the driver diaphragm; and an outlet provided at the upper wall or the side wall, and configured to output the acoustic waves;

wherein the driver diaphragm and the enclosure define a front volume chamber communicating with the outlet, the front volume chamber and the outlet form a front cavity, the upper wall comprises a plate connected with the side wall, and a protrusion attached to the plate and extending from the plate toward the driver diaphragm, the protrusion is located close to the outlet.

14. The loudspeaker according to claim 13, wherein the protrusion has a surface facing the driver diaphragm, the protrusion comprises a first section at which the surface extends parallel to a plane where the driver diaphragm is located.

15. The loudspeaker according to claim 14, wherein the protrusion further comprises a second section connecting the first section and extending away from the outlet, and a distance from the driver diaphragm to the surface at the second section gradually increases in a direction away from the outlet.

16. The loudspeaker according to claim 13, wherein the protrusion extends from a connection between the plate and the side wall to a periphery of the outlet, and a distance from the driver diaphragm to the inner surface gradually increases in a direction away from the outlet.

17. The loudspeaker according to claim 13, wherein the protrusion is of a C-shape, the protrusion includes a body located close to the outlet and two arms connecting both ends of the body and extending away from the outlet.

18. The loudspeaker according to claim 13, wherein two side walls are provided oppositely, each of which is provide with a respective outlet, the protrusion is of a ring-shape and includes two opposing beams each of which is located close to the respective outlet.

* * * * *